United States Patent [19]

Robitaille et al.

[11] Patent Number: 5,495,756
[45] Date of Patent: Mar. 5, 1996

[54] CYLINDRICAL CHAMBER FOR LIQUID METER WITH OSCILLATING PISTON

[75] Inventors: Thierry Robitaille, Riedisheim; Frédéric Walch, Altkirch, both of France

[73] Assignee: Société Sappel, Saint Louis, France

[21] Appl. No.: 251,933

[22] Filed: Jun. 1, 1994

[30] Foreign Application Priority Data

Jun. 2, 1993 [FR] France ................... 93 06591

[51] Int. Cl.⁶ ............................................ G01F 3/08
[52] U.S. Cl. .................. 73/257; 73/252; 418/64; 418/77
[58] Field of Search .................. 73/252, 257, 255; 418/64, 77, 81

[56] References Cited

U.S. PATENT DOCUMENTS

| 2,178,492 | 10/1939 | Powley et al. ................ 418/64 |
| 2,338,152 | 12/1940 | Whittaker ..................... 418/64 |
| 2,735,408 | 5/1951 | Rochford et al. ............... 418/64 |
| 2,789,434 | 4/1957 | Domsch . |
| 3,369,399 | 2/1968 | Coffman et al. . |
| 4,811,600 | 3/1989 | Robitaille . |

FOREIGN PATENT DOCUMENTS

| 792011 | 12/1935 | France . |
| 23564 | 6/1936 | France ........................ 73/257 |
| 2439389 | 5/1980 | France . |
| 8903379 | 6/1989 | Germany . |
| 733371 | 7/1955 | United Kingdom . |

Primary Examiner—Richard Chilcot
Assistant Examiner—Harshad Patel
Attorney, Agent, or Firm—Browdy and Neimark

[57] ABSTRACT

A cylindrical chamber (1) for an oscillating piston type of liquid counter comprises notably a biconcave fixed partition wall (9) and grooves on the lower and/or upper edges of the piston and, as the case may be, on the small cylinders of the chamber 1. The disclosure can be applied to the metering of liquid and, especially, to the metering of water.

17 Claims, 5 Drawing Sheets

5,495,756

CYLINDRICAL CHAMBER FOR LIQUID METER WITH OSCILLATING PISTON

BACKGROUND OF THE INVENTION

1. Field of the Invention

The present invention relates to the field of liquid meters and more specifically to oscillating piston type liquid meters. The use of oscillating piston type liquid meters is a technique well known to those skilled in the art and is recognized for its precision and reliability.

2. Description of the Prior Art

The main element in these counters is a cylindrical chamber referenced 1 in FIG. 1. This chamber has a side wall 6, a bottom 7 and a cover or lid 8, and encloses a piston 2. A small cylinder 11 is supported by the bottom 7 of the chamber 1 while a small cylinder 12 having the same diameter is borne by the lid 8. These two small cylinders are centered with respect to the axis 26 of the chamber 1. Furthermore, a roller 14 is placed at the center of the small cylinder 11. A fixed partition wall 9 with parallel faces is positioned on the internal side of the side wall 6 of the chamber and extends radially throughout the height of this side wall up to the small cylinders 11, 12. The piston 2 is formed by a cylinder divided, in its median part, by a perforated flat wall 3. The diameter of the piston is substantially smaller than the diameter of the chamber 1. A vertical slot 4 made along one of the generatrices of the piston opens out, at the flat wall 3, into an aperture 5 called a bulb of the piston. The flat wall 3 of the piston is provided with studs 13 at the center of its two faces. One stud is positioned above the flat wall and one stud is positioned below the flat wall. The latter has a diameter greater than the diameter of the stud above the flat wall 3. At the closing of the lid 8 of the chamber, the edges of the two small cylinders 11, 12 meet the flat wall 3 of the piston which is then interposed between the two small cylinders 11, 12 while at the same time staying free in its planar motions. Furthermore, the fixed partition wall 9 fits in between the edges 10 of the slot 4 and inside the piston bulb 5.

Specially shaped ports are made on the bottom 7 of the chamber, on either side of the fixed partition wall 9. When the meter is in operation, the liquid penetrates the chamber through one of the ports called an inflow or intake port 24 and emerges by another port called a outflow or discharge port 25. The space between the outer surface of the piston 2 and the inner surface of the chamber 1 forms two recesses. Similarly, the space between the inner surface of the piston and the outer surface of the small cylinders 11, 12 forms two other recesses. The two recesses that open into the intake port and are called intake recesses. The two recesses that open into the outflow port are called outflow recesses. The liquid to be measured that enters the intake recesses communicates its energy to the piston which moves rotationally, while at the same time shifting a given volume of liquid towards the exterior of the chamber by the outflow port. The piston thus oscillates along the fixed partition in a movement, typical in the technique of oscillating pistons, wherein the axis of the piston describes a circle about the axis of the cylindrical chamber while the edges 10 of the slot, which are commonly known as the lips of the piston, slide along the walls of the fixed partition. The stud placed below the flat wall 3 is guided rotationally along the inner walls of the small cylinder or cylinders 11, 12 and around the roller 14. The rotation of the stud above the flat wall 3 increments an accumulating or totalizing revolution counter.

These prior art meters have a certain number of drawbacks related to imperfect mechanical interaction between the piston and the fixed elements of the chamber.

First of all the precision of the meters is limited by the fact that there is leakage of liquid between the different recesses, especially between the lips of the piston and the fixed partition, but also between, respectively, the lower and upper edges of the piston and the bottom and the lid of the chamber, as well as between the edges of the small cylinders and the flat wall of the piston.

As can be seen in FIG. 2, there is an intermediate position P2 of the piston 2 on the fixed partition wall 9, for which the edges 10 of the slot 4 are both in direct contact with the partition wall. For a position P2 such as this, the clearance is the minimum. However, if the position P2 is to be possible, the spacing between the edges of the slot should be far greater than the thickness of the fixed partition wall 9. This results in a transitory gap through which there is leakage during the different stages of the oscillating motion of the piston.

Furthermore, other leaks are caused by clearances between, respectively, the lower edge 15 and the upper edge 16 of the piston 2 and the bottom 7 and the lid 8 of the chamber. To limit this leakage, the approach proposed in the prior art consists in reducing these clearances. The drawback of this approach is that it sensitizes the meter to the impurities that are often contained in the liquid to be measured.

The same approach used to reduce leakage between the flat wall 3 of the piston and the edges of the small cylinders 11, 12 gives rise to the same drawbacks.

The precision of the meters is furthermore restricted by the existence of friction, especially between the lower and upper edges of the piston and the bottom and the lid of the chamber.

Furthermore, the operation of the meter is relatively noisy, especially when the flow rate of liquid introduced into the meter is great, i.e. when the rotational speed of the piston is high.

In fact, the maximum clearance between the fixed partition wall and the edges 10 of the slot 4 is obtained for the position P1 shown in FIG. 2, for which the fixed partition 9 is entirely engaged within the piston 2. Now, in this position, the piston suddenly changes the side by which it is resting on the partition wall. This change is naturally accompanied by a loud clap.

Furthermore, the friction between the piston and the fixed elements of the chamber is a source of noise. This is especially so with friction between, respectively, the lower and upper edges of the piston and the bottom and the lid of the chamber.

Finally the components of the chamber undergo substantial wear and tear.

Indeed the angular profile of the lips of the piston referenced 10 in FIG. 2 imply contact between said lips and the fixed partition wall 9 along one and the same line, thus constituting a linear wearing-out stress.

Clearly, there are other wearing-out regions, especially at the position where the lower and upper edges of the piston are in contact with the chamber.

The aim of the invention is to make a cylindrical chamber for an oscillating piston type meter that overcomes the above-mentioned problems at low cost.

SUMMARY OF THE INVENTION

An object of the invention is a cylindrical chamber for an oscillating piston type liquid meter comprising a side wall, a bottom, a lid and a fixed partition wall made of rigid material and enclosing a piston held along said fixed partition wall by the edges of a vertical slot that opens out at the level of a flat wall of said piston into an aperture, two ports at least being made in the bottom of the cylindrical chamber, wherein the profile of the fixed partition wall is a biconcave profile.

Furthermore, according to the invention, the profile of the edges of the slot is a circular arc profile. According to another essential characteristic of the invention, the profile of the fixed partition wall is defined by a kinematic geometric tracing or kinematic plotting of the envelope profile of the edges of the slot.

Furthermore, and according to yet another essential characteristic of the invention, the lower and/or upper edges of the piston as well as the edges of the small cylinders, if any, include a groove.

BRIEF DESCRIPTION OF THE DRAWINGS

Other features and advantages of the present invention shall appear from the following description made with reference to the appended figures, of which.

MORE DETAILED DESCRIPTION

Figure 1:
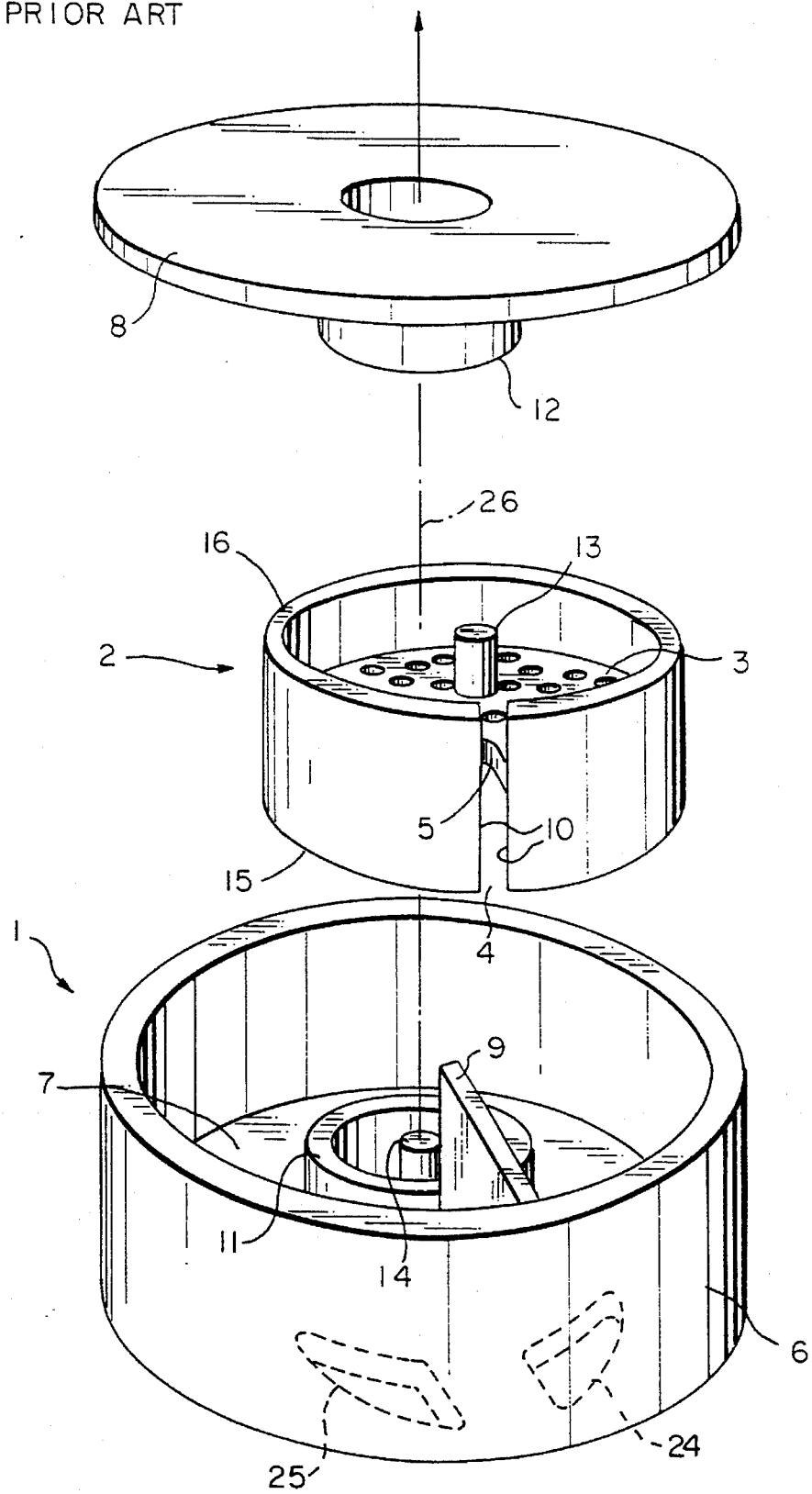
FIG. 1 shows a exploded view in perspective of a cylindrical chamber of a prior art oscillating piston type of liquid meter.
Figure 2:
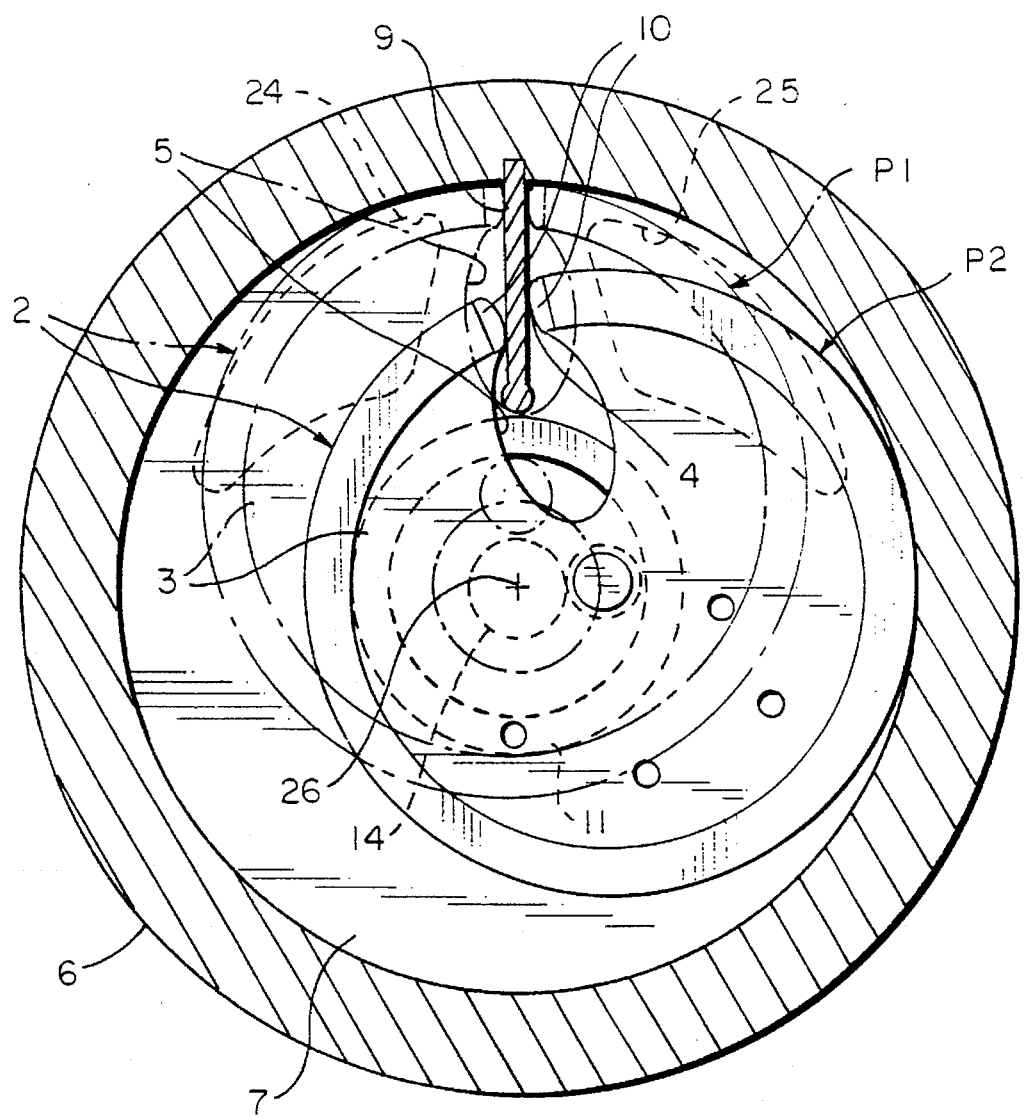
FIG. 2 shows a cross-section, taken at the flat wall of the piston, of a cylindrical chamber of a prior art oscillating piston type of liquid meter.

FIGS. 1 and 2 have already been described in the above introduction and shall not be re-examined here. However they form an integral part of the description, notably in that the same references are used in all the figures.

Figure 3:
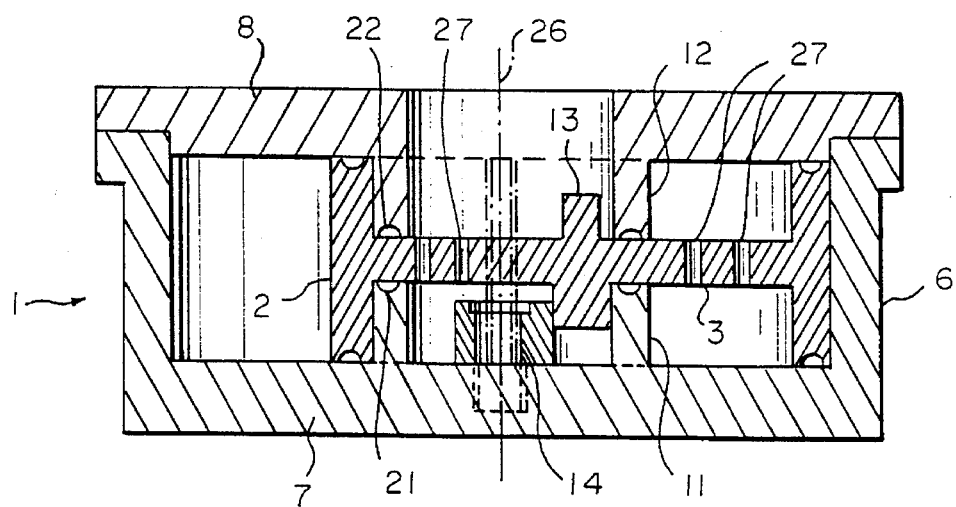
FIG. 3 shows a longitudinal section of a cylindrical chamber of an oscillating piston type of liquid meter according to the invention.

FIG. 3 shows a longitudinal sectional view of a cylindrical chamber 1 of an oscillating piston type of liquid meter according to the invention.

This cylindrical chamber has a side wall 6 that is closed at its lower end by a bottom 7, and at its upper end by a lid 8.

This chamber encloses a piston 2 formed by a hollow cylinder whose diameter is substantially smaller than the diameter of the cylinder 6 of the chamber 1. The piston 2 is held within the chamber, between the bottom 7, the lid 8 and the side wall 6. Furthermore, the piston is usually divided, in its median part, by a plane wall 3 perforated with holes 27.

Two studs 13 emerge from each side of the flat wall 3. These studs are positioned on the axis of the piston. The top stud of the flat wall has a diameter smaller than that of the bottom stud. The latter is then in contact with the inner surface of a small concentric cylinder 11 supported by the bottom 7. Another small cylinder 12 having a diameter substantially equal to the diameter of the small cylinder 11 is borne by the lid 8 of the chamber 1.

The edges of the small cylinders 11, 12 are in contact with the flat wall 3 of the piston while at the same time leaving this flat wall 3 free in its plane.

If necessary, a roller 14 may be placed at the center of the small cylinder 11 in the vicinity of the lower stud of the flat wall.

Figure 4:
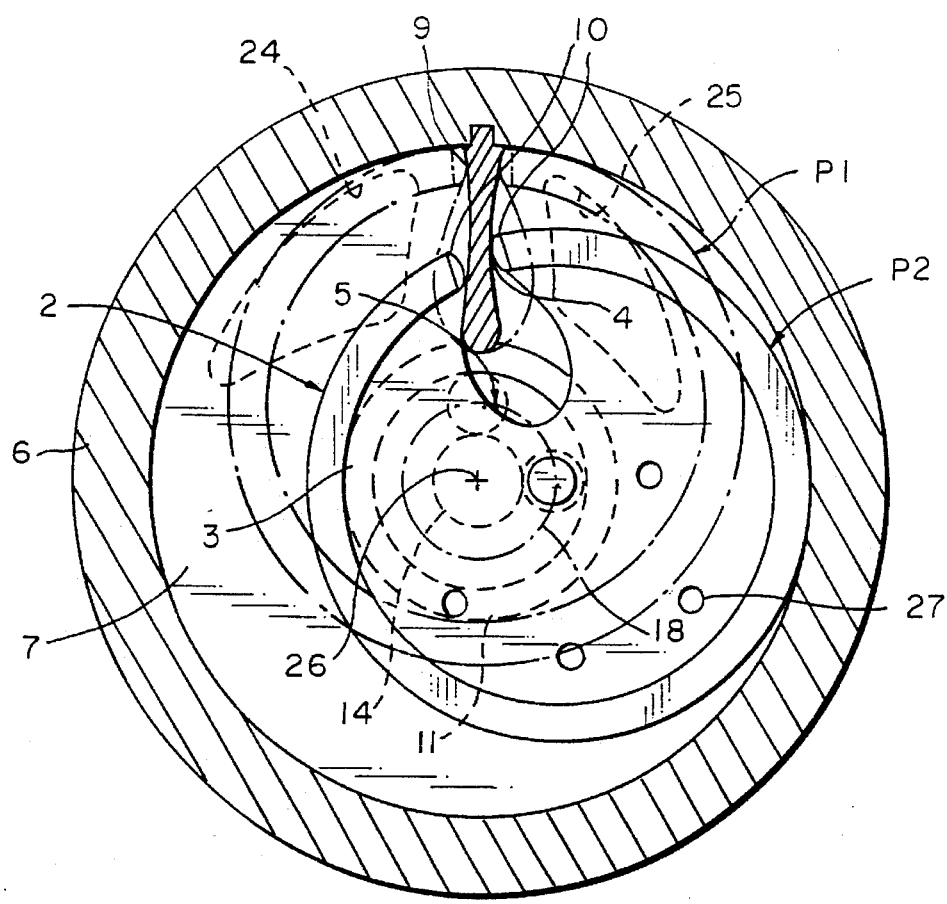
FIG. 4 shows a cross-section, taken at the flat wall of the piston, of a cylindrical chamber of an oscillating piston type of liquid meter according to the invention.

As can be seen in FIG. 4, a vertical slot 4 is made along the height of the piston 2 with a preferably constant spacing between the edges of this slot. The edges of the slot or lips of the piston 10 may have a variety of profiles. However, the profile of the lips of the piston according to the invention is advantageously a circular arc profile.

At the plane wall 3, the vertical slot 4 leads into an aperture 5 commonly called the bulb of the piston because of its bulb shape.

The cylindrical chamber has a fixed partition wall 9 that is fixedly joined to the side wall 6. This partition is made of a rigid material such as a hard plastic. It is radial and extends up to the small cylinders 11, 12 throughout the height of the chamber. Since the spacing between the edges of the slot 4 is greater than the thickness of the fixed partition 9, the piston may be held along said fixed partition wall by the edges 10 of the slot. The fixed partition wall 9 is then engaged into the flat wall 3 of the piston in the piston bulb 5.

At least two ports 24, 25 are made in the bottom 7 of the chamber 1, on either side of the fixed partition wall 9. One of the ports is called an inflow or intake port 24 while the other is called an outflow port 25.

According to the invention, the fixed partition wall 9 has a biconcave profile. The biconcavity of the fixed partition wall 9 may be of any type but is advantageously determined by the Laparci profile plotting method which actually corresponds to the kinematic plotting of the envelope profile of the lips 10 of the piston.

Figure 5:
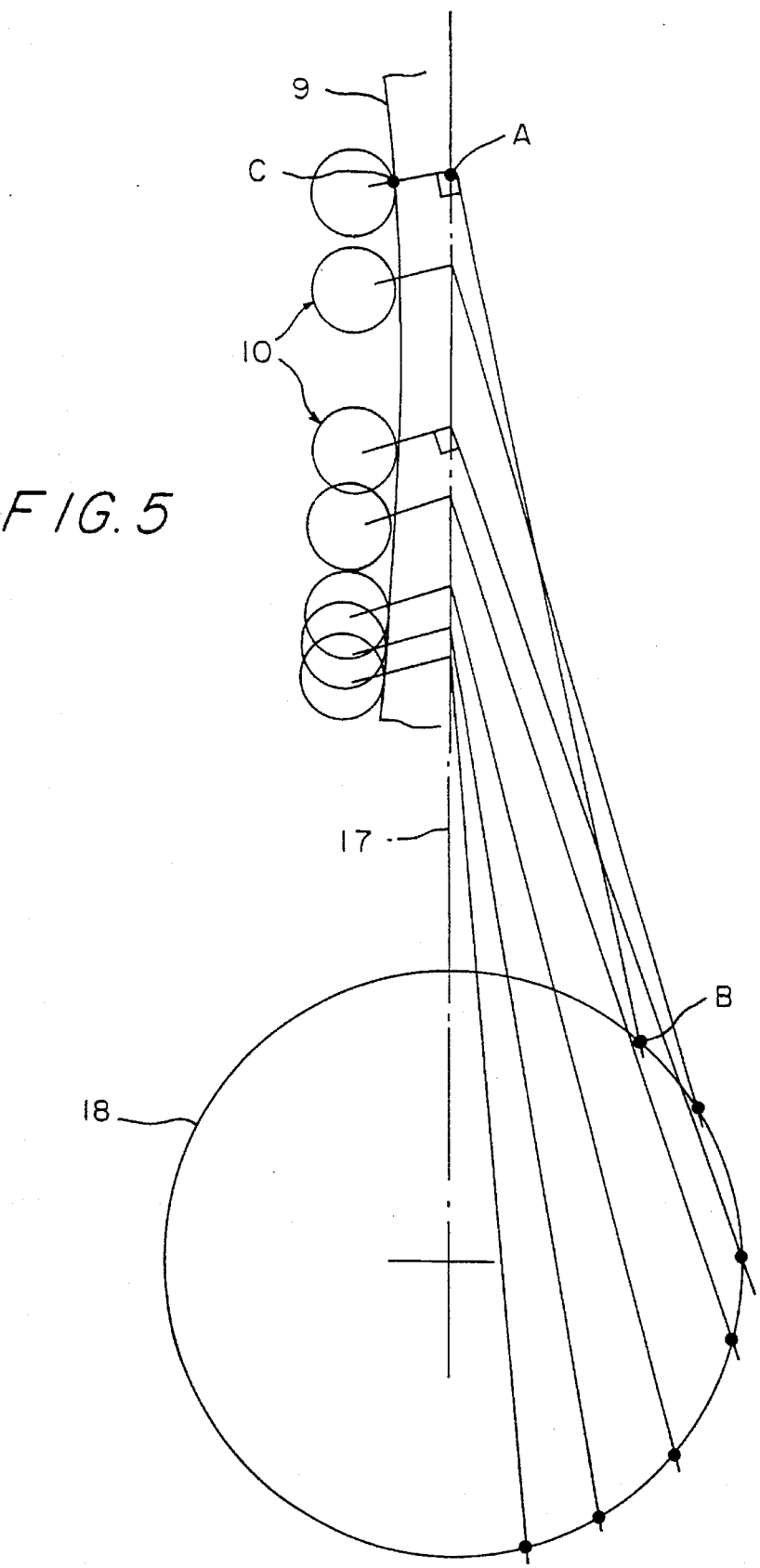
FIG. 5 shows a schematic view of a mode of geometrical construction used to define the profile of a fixed partition wall according to the invention.

FIG. 5 is aimed at showing precisely how it is possible to achieve a simple definition of the biconcavity of the fixed partition wall 9 by the Laparci method. Assuming that a circular profile has been chosen for the lips 10 of the piston, let A, B, C be three points of the plane formed by the flat wall 3 of the piston, such that A is a point of the median plane of the fixed partition wall 9 and B is a point of the cylinder generated by the rotation of the axis of the piston. A therefore belongs to the straight line referenced 17 in FIG. 5 and B belongs to the circle 18. The profile of the fixed partition wall 9 is defined by the set of the points C of the segment AC orthogonal to the segment AB, such that AB corresponds to the radius of the piston and AC corresponds to half, at most, of the width of the slot. All that needs to be done therefore, to determine the profile of the fixed partition wall 9, is to make the point A slide along the axis 17 and the point B slide along the circle 18 and to determine the set of points C by plotting the segment AC orthogonal to the segment AB.

Figure 6:
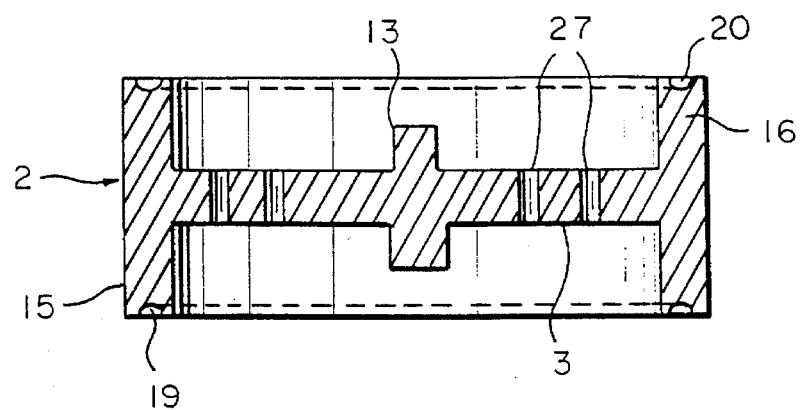
FIG. 6 shows a longitudinal view of a piston according to the invention.

Furthermore, the invention provides for the making of grooves 19, 20 on the lower edge 15 and upper edge 16 of the piston 2. FIG. 6 shows a sectional view of a piston according to the invention. The grooves 19, 20 are advantageously made on the entire circumference of the lower edge 15 of the piston 2 and on the circumference of the upper edge 16 of the piston 2. However, a single groove may be made solely on the lower edge or solely on the upper edge of the piston.

If necessary, grooves 21, 22 are made on the edges of the small cylinders 11, 12 facing the flat wall 3 as can be seen in FIG. 3.

Figure 7:
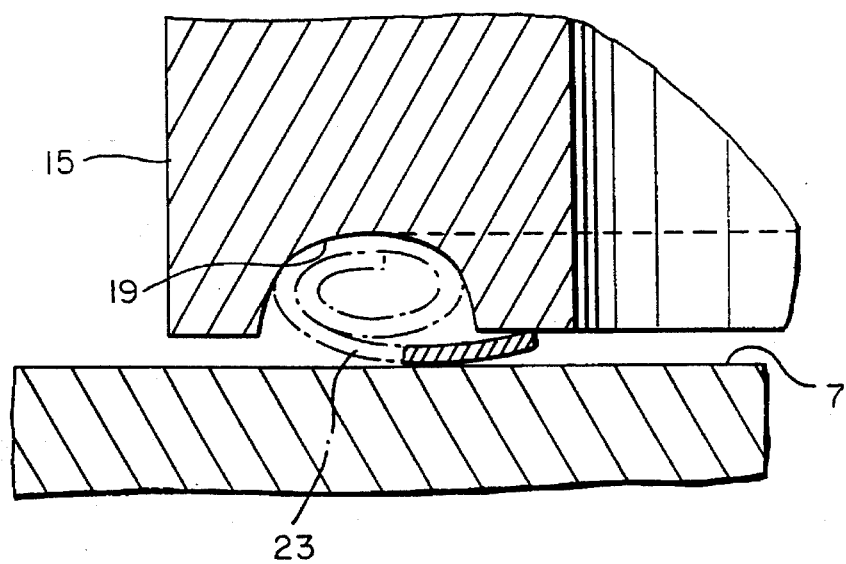
FIG. 7 shows a detailed view and a sectional view of the lower edge of the piston in contact with the bottom of a cylindrical chamber of an oscillating piston type of liquid meter according to the invention.

FIG. 7 shows that the profile of the grooves 19, 20, 21, 22 is advantageously a circular arc profile.

The liquid to be measured penetrates by the intake port 24 made in the bottom 7 of the cylindrical chamber 1 and flows out through the outflow port 25. The flow of incoming liquid causes a rotation of the piston inside said chamber for which the axis of the piston describes a circle 18 about the axis of the cylindrical chamber. The lips 10 of the piston slide along the faces of the fixed partition wall 9. If necessary, the motion of the piston is guided by the bottom stud of the flat wall of the piston, along internal walls of the small cylinders 11, 12 and along walls of the roller 14.

The sliding of the lips 10 of the piston 2 on the fixed partition wall 9 does not change the shape of the rigid and hard profile of this partition wall which remains constant during the metering operations.

The shifting of the lips 10 of the piston 2 is of the roll-and-slide type. A circular arc profile of the lips 10 therefore distributes the wear and tear throughout the surface of said lips without creating any particular wearing-out strains.

For each position of the piston in the chamber, the thickness of the fixed partition wall 9 is such that the clearance between the lips and the sides of the partition wall is approximately constant and at the minimum value. For example, in the position P1 of the piston shown in FIG. 4, the lips of the piston are in contact with the base of the fixed partition wall and of the side walls 6 of the chamber. The thickness of the partition wall is such that the clearance is the minimum and consequently limits the leakage that might occur. The precision of the meter is then improved and the noise level of the meter during operation is reduced.

As for the grooves 19, 20, 21, 22 made on the edges 15, 16 of the piston and on the edges of the small cylinders 11, 12, the liquid flowing in the chamber 1, while passing through the cavity constituted by the grooves, forms a whirlpool 23 as shown in FIG. 7. This whirlpool has the effect of limiting leakage of liquid, firstly, between the lower and upper edges of the piston and the bottom 7 and the lid 8 of the chamber 1 respectively and, secondly, at the small cylinders 11, 12. Furthermore, this whirlpool 23 creates a sort of hydraulic cushion that reduces friction between the mechanical elements in dynamic contact with each other. The noise level and the wear and tear is then reduced, and the precision of the meter is increased.

The invention can be applied to liquid meters, especially to water meters. It is clear that the present description of the chamber 1 made with reference to FIGS. 3 to 7 refers solely to one exemplary embodiment. Other embodiments may be implicitly deduced therefrom without going beyond the scope of the invention.

What is claimed is:

1. In an oscillating piston type liquid meter having a cylindrical chamber, a side wall, a bottom, a lid and a fixed partition wall made of rigid material and enclosing a cylindrical piston, the piston including a vertical slot extending parallel to a cylindrical axis of the piston, the slot including two parallel slot edges defining the slot therebetween, the piston being slidably held along said fixed partition wall by the slot edges during a counting oscillation of the piston, the piston including an internal flat wall, the flat wall including an aperture having an aperture perimeter connecting to the slot edges, at least two ports being in said cylindrical chamber, wherein the profile of the fixed partition wall is a biconcave profile; wherein the improvement comprises:

the biconcave profile having a shape, in cross section perpendicular to a cylindrical chamber axis, defined by the set of points C of a segment AC orthogonal to the segment AB, where A, B, C belong to the plane formed by the flat wall, A belongs to the median plane of the fixed partition wall, B belongs to the cylinder generated by the rotation of the axis of the piston, the segment AB has a length equal to the radius of the piston, and the segment AC has a length equal to at most half of the width of the slot.

2. The improvement according to claim 1, wherein the length of the segment AC is equal to half of the width of the slot.

3. The improvement according to claim 2, wherein the profile of the slot edges is a circular arc profile.

4. The improvement according to claim 3, wherein at least one of the edges of the piston, namely the lower edge or the upper edge, has a piston-edge groove.

5. The improvement according to claim 1, wherein the chamber has at least one small concentric cylinder and wherein the flat wall of the piston has at least one central stud.

6. The improvement according to claim 5, wherein the chamber includes at least one small cylinder supported by an end wall of the chamber and having a cylinder groove on a surface thereof, the surface being in contact with the flat wall.

7. The improvement according to claim 6, wherein the profile of the groove is a circular arc profile.

8. The improvement according to claim 5, wherein at least one of the edges of the piston, namely the lower edge or the upper edge, has a piston-edge groove.

9. The improvement according to claim 8, wherein the chamber includes at least one small cylinder supported by an end wall of the chamber and having a cylinder groove on a surface thereof, the surface being in contact with the flat wall.

10. The improvement according to claim 8, wherein the profile of the groove is a circular arc profile.

11. The improvement according to claim 1, wherein at least one of the edges of the piston, namely the lower edge or the upper edge, has a piston-edge groove.

12. The improvement according to claim 11, wherein the chamber includes at least one small cylinder supported by an end wall of the chamber and having a cylinder groove on a surface thereof, the surface being in contact with the flat wall.

13. The improvement according to claim 11, wherein the profile of the groove is a circular arc profile.

14. The improvement according to claim 1, wherein the profile of the slot edges is a circular arc profile.

15. The improvement according to claim 14, wherein at least one of the edges of the piston, namely the lower edge or the upper edge, has a piston-edge groove.

16. The improvement according to claim 15, wherein the chamber includes at least one small cylinder supported by an end wall of the chamber an having a cylinder groove on a surface thereof, the surface being in contact with the flat wall.

17. The improvement according to claim 16, wherein the profile of the groove is a circular arc profile.

* * * * *